May 31, 1938.  S. F. MARINO  2,118,891

ANTIFRICTION BEARING

Filed May 29, 1936

INVENTOR:
SALVATORE F. MARINO,
BY Gales P. Moore
HIS ATTORNEY.

Patented May 31, 1938

2,118,891

UNITED STATES PATENT OFFICE 2,118,891

ANTIFRICTION BEARING

Salvatore F. Marino, Plainville, Conn., assignor to General Motors Corporation, Detroit, Mich., a corporation of Delaware Application May 29, 1936, Serial No. 82,573

6 Claims. (Cl. 308—236)

This invention relates to antifriction bearings and comprises all of the features of novelty herein disclosed. An object of the invention is to provide improved means for securing the race ring of a bearing to a support. Another object is to provide a simple and efficient wedging device to interpose between a race ring and a support to prevent relative movement of such parts. Another object is to provide a race ring with an improved device to wedge it tightly to a support without distortion of the bearing raceway.

To these ends and also to improve generally upon devices of this character, the invention further consists in the various matters hereinafter described and claimed. In its broader aspects, the invention is not necessarily limited to the specific construction selected for illustrative purposes in the accompanying drawing, in which—

Figure 1:
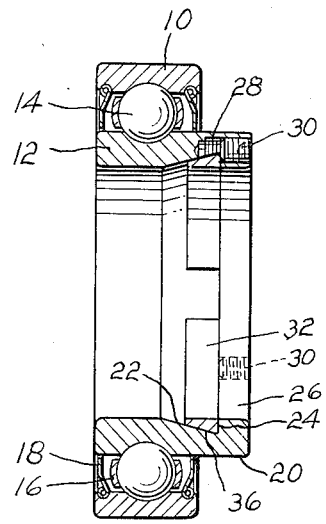
Fig. 1 is a sectional view taken axially of the bearing.
Figure 2:
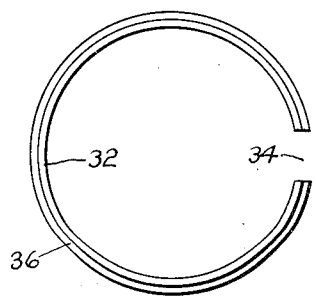
Fig. 2 is a side view of a split ring wedging member.
Figure 3:
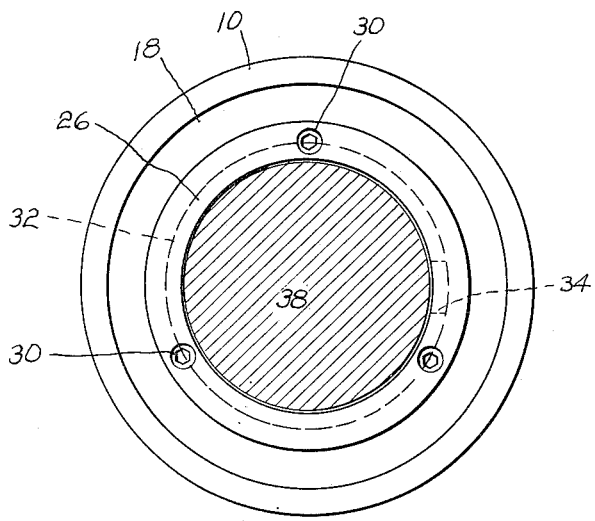
Fig. 3 is a side elevation of the bearing with a supporting shaft in section.

The numeral 10 indicates the outer race ring of a bearing having an inner race ring 12 with a raceway for rolling elements 14 spaced apart by a separator 16. Grease shields 18 if desired may be used to close up the ends of the bearings. The foregoing is merely illustrative of a suitable bearing to which the invention may be applied and the rolling elements may be balls or rollers.

When the inner race ring 12 is the one to be secured to a support, it is extended at one end as at 20 and provided with an internal groove formed by a conical wall or taper 22 and a flat wall or abutment 24. The resulting end flange or collar 26 has its bore in substantial alignment with the bore of the ring 12. The recess is beyond the plane of the rolling elements and gradually deepens in a direction away from a point wholly at one side of the direct load on the rolling elements towards the adjacent end of the race ring so that the race ring is not weakened in the region of the raceway surface and hence clamping forces will not distort the raceway. The race ring has a plurality of threaded openings 28, preferably three, each opening receiving a socket headed screw 30 adapted to engage the thick end of a displaceable wedging ring 32. The end flange or collar 26 overhangs radially and overlaps the wedging ring, and the threaded openings 28 extend through the flange and beyond it. The wedging ring is preferably split as indicated at 34 and has inherent tendency to expand. It has a conical outer surface or taper 36 conforming to the conical wall 22 and the resilient pressure between the conical surfaces urges the thick end of the wedging ring against the wall or abutment 24. In this initial position, the bore of the wedging ring is in substantial alignment with the bore of the race ring 12 so that the assembled unit-handling structure will readily slip over a supporting shaft 38 designed to have a slight clearance with the bore. By turning the screws 30 to force them endwise, the wedging ring is forced endwise, and the reaction of the conical surfaces contracts the wedging ring so that it wedges tightly between the race ring and the shaft.

I claim:

1. In a device of the character described, a race ring having a tapering annular recess, a wedging ring fitting wholly within the recess, one end of the race ring carrying a flange overhanging radially and overlapping one end of the wedging ring, and means reacting between the flange and the wedging ring for forcing the latter to project from the recess and engage a support; substantially as described.

2. In a device of the character described, a race ring having a tapering annular recess terminating at a shoulder, a wedging ring fitting within the recess and normally engaging its thick end against the shoulder, and means carried by the race ring at the shouldered end of the recess for forcing the wedging ring to deflect out of the recess against a support; substantially as described.

3. In a device of the character described, a race ring having a tapering annular recess formed by a conical wall and an abutment wall, a resilient wedging ring having a conical surface conforming to the conical wall, the wedging ring having a thick end urged against the abutment wall, and means engaging said end of the wedging ring to force the latter away from the abutment wall; substantially as described.

4. In a device of the character described, a race ring having a raceway and a recess beyond the plane of the raceway, a wall of the recess being conical and increasing in depth towards the adjacent end of the race ring, a wedging member having a tapering surface conforming to the conical wall of the recess, and means for causing relative axial movement between the wedging member and the race ring to force the wedging member against a support; substantially as described.

5. In a device of the character described, a race ring having a raceway and an axial extension beyond the raceway, the extension having an internal annular recess with a tapering wall, a yieldable ring fitting in the recess and having a tapering surface engaging said tapering wall, the yieldable ring having its bore in substantial alignment with the bore of the race ring to provide for slipping such parts over a shaft, and means reacting between the race ring and the end of the yieldable ring for causing the latter to contract upon the shaft; substantially as described.

6. In a device of the character described, a ring having a portion of its bore provided with a tapered annular recess having a conical wall, an annular wedging ring in the recess and having its outer wall conical and engaging the conical wall, the recessed ring having an annular extension overhanging beyond the recess, and threaded screws passing through openings of said overhanging extension and engaging the wedging ring to force it along the conical wall for contraction against a support; substantially as described.

SALVATORE F. MARINO.